United States Patent
Barton et al.

(10) Patent No.: US 10,054,108 B2
(45) Date of Patent: Aug. 21, 2018

(54) WIND TURBINE SYSTEM AND METHOD FOR CONTROLLING A WIND TURBINE SYSTEM BY POWER MONITORING

(71) Applicant: General Electric Company, Schenectady, NY (US)

(72) Inventors: Werner Barton, Westfalenring (DE); Hartmut Scholte-Wassink, Im Wiesengrund (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 158 days.

(21) Appl. No.: 14/511,242

(22) Filed: Oct. 10, 2014

(65) Prior Publication Data

US 2016/0102653 A1 Apr. 14, 2016

(51) Int. Cl.
F03D 7/00 (2006.01)
F03D 7/02 (2006.01)
F03D 9/25 (2016.01)

(52) U.S. Cl.
CPC ............... *F03D 7/00* (2013.01); *F03D 7/028* (2013.01); *F03D 7/0272* (2013.01); *F03D 9/255* (2017.02); *F05B 2270/1033* (2013.01); *F05B 2270/304* (2013.01); *F05B 2270/327* (2013.01); *F05B 2270/335* (2013.01); *Y02E 10/723* (2013.01)

(58) Field of Classification Search
CPC .......... F03D 7/00; F03D 7/0272; F03D 7/028; F03D 9/003; F05B 2270/1033; F05B 2270/304; F05B 2270/327; F05B 2270/335
See application file for complete search history.

(56) References Cited

U.S. PATENT DOCUMENTS

| | | | |
|---|---|---|---|
| 7,068,015 B1 | 6/2006 | Feddersen | |
| 8,294,288 B2* | 10/2012 | Rivas | F03D 7/0224 290/44 |
| 2003/0044274 A1* | 3/2003 | Deane | F03D 7/0236 416/1 |
| 2006/0273595 A1* | 12/2006 | Avagliano | F03D 7/028 290/44 |
| 2009/0322086 A1* | 12/2009 | Letas | F03D 7/0272 290/44 |
| 2010/0133826 A1 | 6/2010 | Santiago et al. | |

(Continued)

OTHER PUBLICATIONS

A PCT Search Report and Written Opinion issued in connection with corresponding PCT Application No. PCT/US2015/055044 dated Jan. 21, 2016.

*Primary Examiner* — Tulsidas C Patel
*Assistant Examiner* — S. Mikailoff
(74) *Attorney, Agent, or Firm* — Douglas D. Zhang; GE Global Patent Operation

(57) ABSTRACT

A method for controlling a wind turbine system is provided. The wind turbine system includes a power conversion assembly for converting electrical power into a converted electrical power. The method includes monitoring a power extraction parameter, wherein the power extraction parameter is indicative of the power extracted by the wind turbine system from the wind prior to being converted in the power conversion assembly. The method further includes controlling one or more operational variables of the wind turbine system in response to monitoring the power extraction parameter.

18 Claims, 9 Drawing Sheets

(56) References Cited

U.S. PATENT DOCUMENTS

| | | | |
|---|---|---|---|
| 2010/0140940 A1* | 6/2010 | Kammer | F03D 7/0224 |
| | | | 290/44 |
| 2011/0089694 A1 | 4/2011 | Arinaga et al. | |
| 2011/0140421 A1 | 6/2011 | Scholte-Wassink | |
| 2012/0029892 A1 | 2/2012 | Thulke | |
| 2012/0061966 A1 | 3/2012 | Ito et al. | |
| 2012/0104756 A1* | 5/2012 | Beekmann | F03D 7/0224 |
| | | | 290/44 |
| 2012/0205913 A1* | 8/2012 | Garcia Andujar | F03D 7/0276 |
| | | | 290/44 |
| 2012/0211985 A1* | 8/2012 | Siebers | F03D 7/02 |
| | | | 290/44 |
| 2013/0026759 A1 | 1/2013 | Krueger et al. | |
| 2013/0106107 A1* | 5/2013 | Spruce | F03D 7/0224 |
| | | | 290/44 |
| 2013/0184884 A1* | 7/2013 | More | F03D 7/0284 |
| | | | 700/291 |
| 2013/0249215 A1* | 9/2013 | Egedal | H02J 3/16 |
| | | | 290/44 |
| 2014/0217742 A1* | 8/2014 | Caruso | F03D 1/0608 |
| | | | 290/55 |

* cited by examiner

WIND TURBINE SYSTEM AND METHOD FOR CONTROLLING A WIND TURBINE SYSTEM BY POWER MONITORING

BACKGROUND

The subject matter described herein relates generally to methods and systems for controlling wind turbines, and more particularly, to methods and systems for controlling wind turbines in response to monitoring the operation of the wind turbines.

Generally, a wind turbine includes a turbine that has a rotor that includes a rotatable hub assembly having multiple blades. The blades transform wind power into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical power to electrical power, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency at which electric power is generated to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with predefined rated power limits. To operate within such rated power limits, the electrical and/or mechanical components may be operated with large margins for the operating limitations. Such operation may result in inefficient wind turbine operation, and a power generation capability of the wind turbine may be underutilized.

Known wind turbines may have a control system to control mechanical and electrical components and/or other operational variables of the wind turbines. Typically, a control system receives a plurality of input signals providing information about the operational status of the wind turbine. A control system may control a plurality of operational variables of the turbine based on the information provided by the input signals. Controlling a wind turbine can be particularly challenging, given the complexity of a control system and the control algorithms that it may use.

In view of the above, considering the growing demands for increasing the power generation capability of wind turbines, there is a need to further improve the control of wind turbines.

BRIEF DESCRIPTION

In one aspect, a method for controlling a wind turbine system is provided. The wind turbine system includes a power conversion assembly for converting electrical power into a converted electrical power. The method includes monitoring a power extraction parameter, wherein the power extraction parameter is indicative of the power extracted by the wind turbine system from the wind prior to being converted in the power conversion assembly. The method further includes controlling one or more operational variables of the wind turbine system in response to monitoring the power extraction parameter.

In another aspect, a further method for controlling a wind turbine system is provided. The wind turbine system includes: a rotor for transforming wind power into a mechanical rotational power; a generator for converting the mechanical rotational power into electrical power; and a power conversion assembly for converting the electrical power generated by the generator into a converted electrical power. The method includes monitoring a power flow parameter. The power flow parameter is indicative of the power flowing from the rotor to the power conversion assembly prior to being converted in the power conversion assembly. The method further includes controlling one or more operational variables of the wind turbine system in response to monitoring the power flow parameter.

In yet another aspect, a wind turbine system is provided. The wind turbine system includes a rotor for transforming wind power into a mechanical rotational power. The wind turbine system further includes a generator for converting the mechanical rotational power into electrical power. The wind turbine system further includes a power conversion assembly for converting the electrical power generated by the generator into a converted electrical power. The wind turbine system further includes a monitoring unit adapted to monitor a power flow parameter, the power flow parameter being indicative of the power flowing from the rotor to the power conversion assembly prior to being converted in the power conversion assembly. The wind turbine system further includes a control unit configured to control one or more operational variables of the wind turbine system in response to receiving data about the monitored power flow parameter, the data about the monitored power flow parameter being provided to the control unit by the monitoring unit.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a method that provides an improved control of a wind turbine system. More specifically, the method uses accurate data about the power extracted from the wind by the wind turbine system. Using this accurate data to control the wind turbine system provides for an improved control of the system. In particular, an improved torque/speed curve may be provided. Further, the method eliminates the need to model and/or estimate unknown power losses that may occur during operation of the wind turbine. In addition, the method is an adaptive method which provides a control of the wind turbine system that is tailored to the operation of the system with regard to its rated power. Accordingly, an improved control may be provided for both a wind turbine system operating below its rated power and a wind turbine system operating at or above its rated power.

As used herein, the term "blade" is intended to be representative of any device that provides a reactive force when in motion relative to a surrounding fluid. As used herein, the term "wind turbine" is intended to be representative of any device that generates rotational power from wind power, and more specifically, converts kinetic power of wind into mechanical power. As used herein, the term "wind generator" is intended to be representative of any wind turbine that generates electrical power from rotational power generated from wind power, and more specifically, converts mechanical power converted from kinetic power of wind to electrical power.

Figure 1:
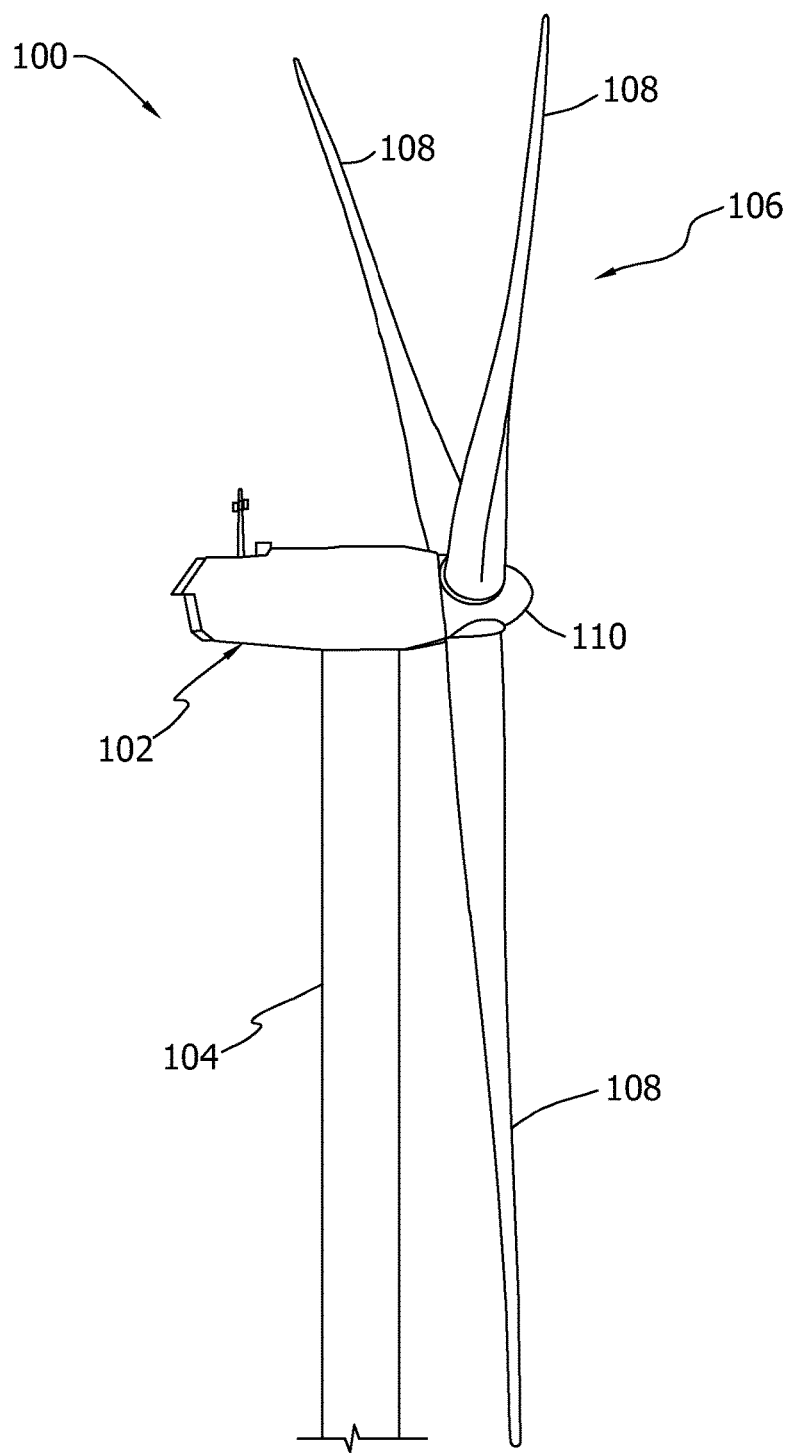
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
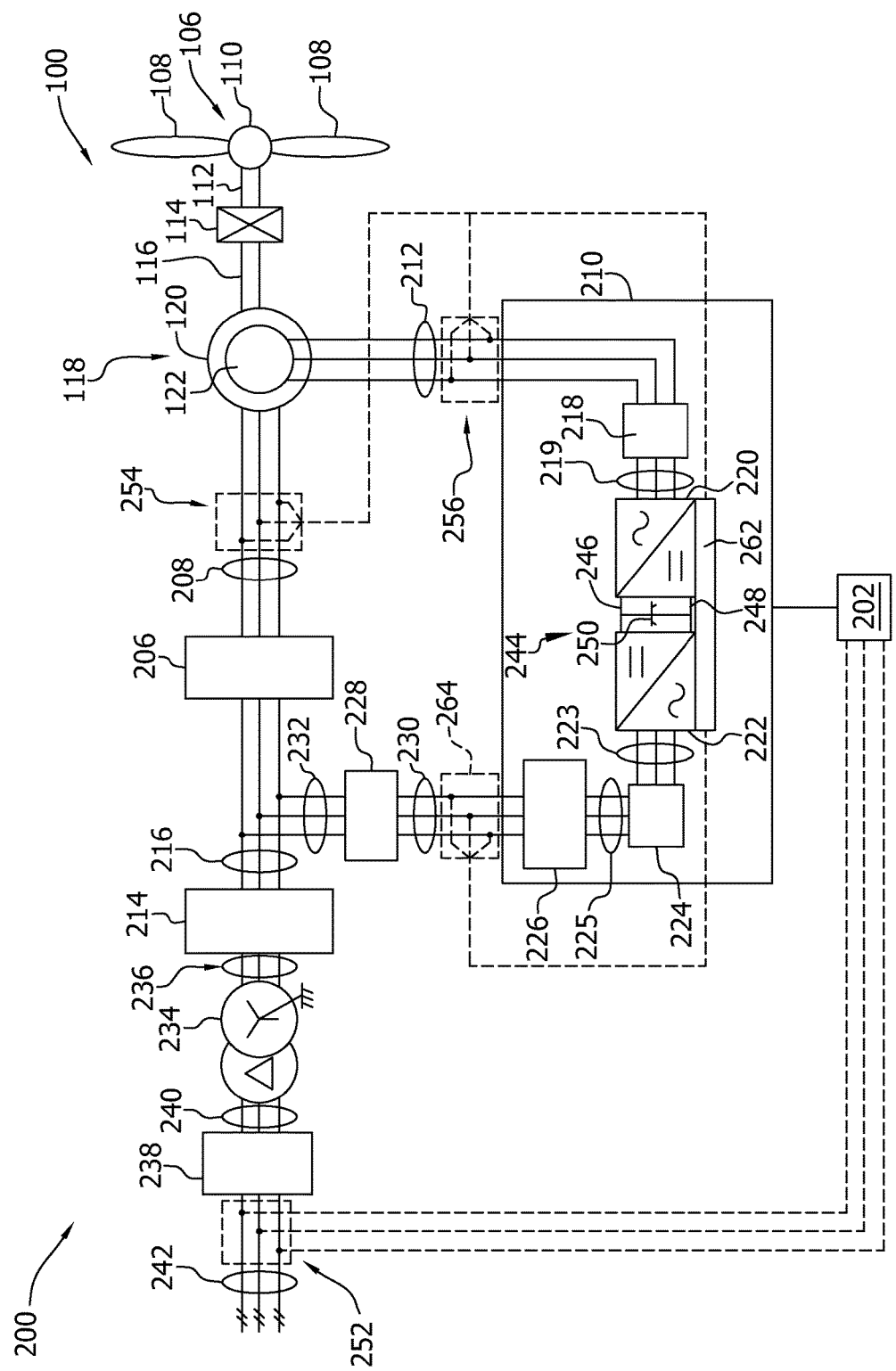
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind power into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical power to a sinusoidal, three-phase alternating current (AC) electrical power signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Embodiments described herein relate to a method for controlling a wind turbine system. The wind turbine system may include a power conversion assembly, such as e.g. power conversion assembly 210 shown in FIG. 2, for converting electrical power into a converted electrical power.

According to embodiments, which can be combined with other embodiments described herein, AC electrical power is provided to the power conversion assembly. More specifically, three-phase, sinusoidal AC electrical power may be provided to the power conversion assembly.

The power conversion in the power conversion assembly may include a first power conversion and a second power conversion. The first power conversion may include a power conversion from AC power to a DC power by a first power converter, such as e.g. rotor-side power converter 220 shown in FIG. 2. The second power conversion may include a power conversion from the DC power into an AC power, more specifically a three-phase, sinusoidal AC electrical power. This may be done with pre-determined voltages, currents, and/or frequencies. The second power conversion may be performed by a second power converter, such as e.g. line-side power converter 222 shown in FIG. 2.

The power conversion assembly may be adapted for converting electrical power into a converted electrical power. Therein, the term "converted electrical power" can include a power resulting from performing a power conversion process in the power conversion assembly to the electrical power transmitted to the power conversion assembly. Typically, the converted electrical power has different characteristics compared to the power transmitted to the power conversion assembly. For example, the converted electrical power may have different voltages, currents, and/or frequencies. For power conversions in the power conversion assembly which include a first power conversion and a second power conversion and optionally further power conversions, the converted electrical power may include the power resulting from the first, second and/or further power conversions. For example, with respect to the embodiment shown in FIG. 2, the term "converted electrical power" may refer to the DC power transmitted from rotor-side power converter 220 towards line-side power converter 222, and/or to the AC power transmitted from line-side power converter 222 towards line-side power converter bus 223.

Figure 3:
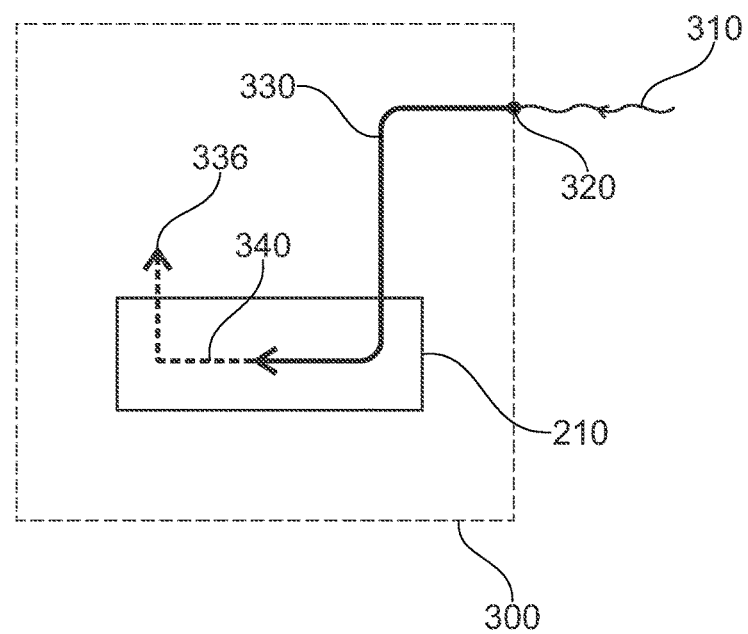
FIG. 3 illustrates a wind turbine system extracting power from the wind, according to embodiments described herein.

FIG. 3 schematically illustrates a wind turbine system 300 extracting power from the wind, wherein the wind turbine system includes power conversion assembly 210. Arrow 310 directed towards the wind turbine system illustrates the wind blowing towards the wind turbine system. Arrow 310 enters node 320 disposed at an outer region of the wind turbine system; this illustrates the wind impacting on the wind turbine system. For example, node 320 may correspond to a turbine rotor (not shown) included in the wind turbine system, wherein the wind may act on the turbine rotor. At node 320, power may be extracted from the wind by the wind turbine system. For example, in the case of a wind turbine system including a rotor, the rotor may extract rotational mechanical power from wind power. The power extracted by the wind turbine system may subsequently be transmitted through the wind turbine system, as indicated by directed path 330 extending through the wind turbine system from node 320 to the power conversion assembly. Directed path 330 schematically represents a trajectory along which the power extracted by the wind turbine may flow and/or be transmitted to the power conversion assembly. Along its trajectory to the power conversion assembly, the power may flow through one, more than one, or a multitude of components (not shown) included in the wind turbine system. Such components may include electrical and/or mechanical components, such as e.g. a high-speed shaft, a low-speed shaft, a generator, and/or other components. Alternatively and/or in addition, along its trajectory to the power conversion assembly, the power may flow through one, more than one, or a multitude of wires (not shown), such as e.g. electrical wires, where the wires may connect components included in the wind turbine system. The directed path 330 may schematically represent the trajectory of the power along such components and/or wires.

During transmission through the wind turbine system, the power extracted by the wind turbine system may be transformed, once, or twice, or three times, or more than three times, from one form of power to another form of power. At a given moment in time, the power extracted by the wind turbine system may have the form of a mechanical power, more specifically a mechanical rotational power; an electrical power, more specifically a DC electrical power and/or an AC electrical power; or a further form of power.

As shown in FIG. 3, the power extracted by the wind turbine system, being transmitted according to directed path 330, may be provided to the power conversion assembly. Upon being provided to the power conversion assembly, the power extracted by the wind turbine system may be an electrical power. The electrical power may subsequently be transmitted through the power conversion assembly according to directed path 330 and subsequently according to a second directed path 340, wherein the second directed path is shown as dotted line. Directed path 330 transitions into the second directed path 340 within the power conversion assembly.

Power conversion assembly 210 may be adapted for converting the power extracted by the wind turbine system into a converted electrical power. The conversion of power within the power conversion assembly is schematically illustrated by the transition of directed path 330 into the second directed path 340. Accordingly, prior to being converted in the power conversion assembly, the power extracted by the wind turbine system from the wind may flow along directed path 330. Further, the converted electrical power may be transmitted through the power conversion assembly along the second directed path 340. As further exemplary indicated by arrow 336 of the second directed path 340, the converted power may flow away from the power conversion assembly, e.g. towards an electric grid (not shown) or, more specifically, towards an electric power transmission and distribution grid (not shown), or towards another component.

A method for controlling a wind turbine system, as described herein, may include monitoring a power extraction parameter. The power extraction parameter may be indicative of the power being extracted by the wind turbine system from the wind prior to being converted in the power conversion assembly, such as e.g. the power being transmitted according to directed path 330 shown in FIG. 3.

The power extracted by the wind turbine system from the wind may include a power resulting from a power extraction process performed by the wind turbine system, wherein the power extraction process may include a transformation of wind power provided to the wind turbine system into a power being transmitted through the wind turbine system. According to embodiments described herein, the power extracted by the wind turbine from the wind may flow through the wind turbine system to the power conversion assembly.

According to embodiments, which can be combined with other embodiments described herein, the power extraction parameter may be a physical quantity which quantifies an amount of power, or more specifically a physical quantity which directly quantifies an amount of power. Accordingly, the power extraction parameter may be a physical quantity that quantifies an amount of energy divided by an amount of time. According to other embodiments, the power extraction parameter may be substantially related to an amount of power, as appreciated by the skilled person. For example, the power extraction parameter may be a torque, more specifically a mechanical torque, such as e.g. an air gap torque and/or a torque applied to rotatable shaft included in the wind turbine system. A torque may quantify an amount of Force times a Distance. A torque T may be substantially related to an amount of power P via the mathematical relation P=Tω where ω denotes an angular speed.

The power extraction parameter may be a physical quantity having units of energy divided by Time, i.e. the units of an amount of power. For example, the units of the power extraction parameter may be kilowatt (kW) or megawatt (MW). For a power extraction parameter being a torque, the power extraction parameter may have units of Force×Distance, such as kiloNewton-meter (kNm) or megaNewton-meter (MNm).

The act of "monitoring" a parameter, such as monitoring the power extraction parameter, can be understood as an act of gathering data about the actual value of the parameter. The data about the actual value of the parameter may include a numerical value approximating the actual value of the parameter. Monitoring a parameter may include: monitoring the parameter at a single moment in time; monitoring the parameter continuously over a period of time; monitoring the parameter over a period of time at regular or irregular intervals; or a combination thereof. Monitoring a parameter may e.g. include measuring the parameter, e.g. by means of one or more sensors. Alternatively or in addition, monitoring a parameter may include calculating or estimating the parameter, e.g. by using a processor or computer, wherein a calculation or estimation of the parameter may e.g. be based on measurement of one or more further parameters.

Power losses may occur when power is converted in the power conversion assembly. Typically, it is hard to predict these losses with high accuracy. Accordingly, monitoring the power being extracted by the wind turbine system prior to being converted in the power conversion assembly may be beneficial in that power is monitored before such power losses may occur. This may avoid the need to model and/or estimate such power losses. Accordingly, accurate data can be provided about the operation of the wind turbine system and, specifically, about the performance of the wind turbine system in extracting power from the wind and, more specifically, about the performance of the wind turbine system in extracting electrical and/or mechanical power from wind power.

A method for controlling a wind turbine system, as described herein, may further include controlling one or more operational variables of the wind turbine system in response to monitoring the power extraction parameter. Controlling the one or more operational variables in response to the monitoring may include: receiving data about the actual value of the power extraction parameter at a given moment in time, the received data being provided by a process of monitoring the parameter; and using the received data to control the one or more operational variables of the wind turbine system at a subsequent moment in time.

Controlling one or more operational variables of the wind turbine system may include calculating or estimating target values for one or more operational variables. Further, after calculating or estimating the target values, the one or more operational variables may be controlled such as to minimize the difference between the actual value of an operational variable and its corresponding target value.

According to embodiments, which can be combined with other embodiments described herein, controlling one or more operational variables of the wind turbine system may include a model based control or other control methods.

According to embodiments, which can be combined with other embodiments described herein, controlling one or more operational variables of the wind turbine system may include one or more of the following options. An option includes controlling the rotational speed of the rotor. As an additional or alternative option, the rotor may include one or more blades, such as e.g. blades 108 shown in FIG. 2, and controlling one or more operational variables of the wind turbine system may include controlling the pitch of at least one blade of the rotor. As another additional or alternative option, the generator may have a magnetic load, and controlling one or more operational variables of the wind turbine system may include controlling the magnetic load. As still another additional or alternative option, controlling one or more operational variables of the wind turbine system may include controlling a torque applied to one or more rotatable shafts included in the wind turbine system, wherein the one or more rotatable shafts may be rotationally coupled to the rotor and/or the generator.

An advantage of controlling one or more operational variables in response to monitoring the power extraction parameter may be that the control is based on accurate data about the power extracted by the wind turbine system. This may provide an improved control of the wind turbine system.

According to embodiments, which can be combined with other embodiments described herein, the wind turbine system may have a rated power. The term "rated power" can include a maximum electrical power output which a wind turbine system is designed to achieve under normal operating and external conditions. More specifically, a rated power can include a maximum continuous electrical power output which a wind turbine system is designed to achieve under normal operating and external conditions.

According to embodiments, which can be combined with other embodiments described herein, the wind turbine system may be controlled with an adaptive method, wherein the adaptive method depends on whether the turbine operates below its rated power or whether the wind turbine system operates at or above its rated power. Specifically, according to embodiments, the power in the turbine may be monitored at different operating points and the wind turbine system may subsequently be controlled in response to the monitoring. The operating points may depend on whether the turbine operates below its rated power or at/above its rated power. Having different operating points may provide advantages compared to e.g. having the same operating point independent of whether the wind turbine system operates below, at or above its rated power. An advantage may be that the control of the wind turbine system can be optimally tailored to the operation of the wind turbine system with regard to its rated power.

According to embodiments, which can be combined with other embodiments described herein, monitoring the power extraction parameter and controlling one or more operational variables of the wind turbine system in response to monitoring the power extraction parameter may be carried out while the wind turbine system operates below its rated power.

According to embodiments, which can be combined with other embodiments described herein, the output power of the wind turbine system may be monitored while the wind turbine system operates at or above its rated power. Further, according to embodiments, one or more operational variables of the wind turbine system may be controlled in response to monitoring the output power, while the wind turbine system operates at or above its rated power.

The output power of the wind turbine system may include the power supplied by the wind turbine system to an electric grid or, more specifically, to an electric power transmission and distribution grid.

While the wind turbine system operates below its rated power, the wind speed may be low. Accordingly, it may be important for the wind turbine system to extract a maximal amount of power from the wind. An advantage of monitoring the power extraction parameter while the turbine operates below its rated power may be that thereby the power extracted by the wind turbine system is monitored before power losses may occur in the power conversion assembly. Accordingly, an improved control of the wind turbine system during operation below rated power may be provided. Specifically, an improved torque/speed curve may be provided.

While the wind turbine system operates at or above rated power, the wind speed is typically high and it may be unnecessary to further optimize the performance of the wind turbine system in extracting power from the wind. Particularly relevant may be a monitoring of the output power of the wind turbine system while operating at or above rated power. An advantage of monitoring the output power may be that thereby the power supplied to an electric grid can be accurately monitored. Accordingly, an improved control of the wind turbine system during operation at or above rated power may be provided.

According to embodiments, the wind turbine system may be operated according to a variable speed operational mode while the wind turbine system operates below its rated power.

The wind turbine system may include a rotor, such as e.g. rotor 106 shown in FIG. 2, for transforming wind power into a mechanical rotational power. A "variable speed operational mode" of the wind turbine system, as used herein, may include an operational mode during which the rotational speed of the rotor is changeable. In particular, the rotational speed of the rotor may be changeable in response to varying wind conditions. A technical effect may be that power may be extracted efficiently from the wind by varying the rotational speed of the rotor in response to varying wind conditions. Specifically, wind power may be efficiently transformed into a rotational mechanical power.

According to embodiments, the wind turbine system may be operated according to a non-variable speed operational mode while the wind turbine system operates at or above its rated power.

A "non-variable speed operational mode" of the wind turbine system can include an operational mode in which the turbine is configured to maintain a fixed rotational speed of the rotor.

Figure 10:
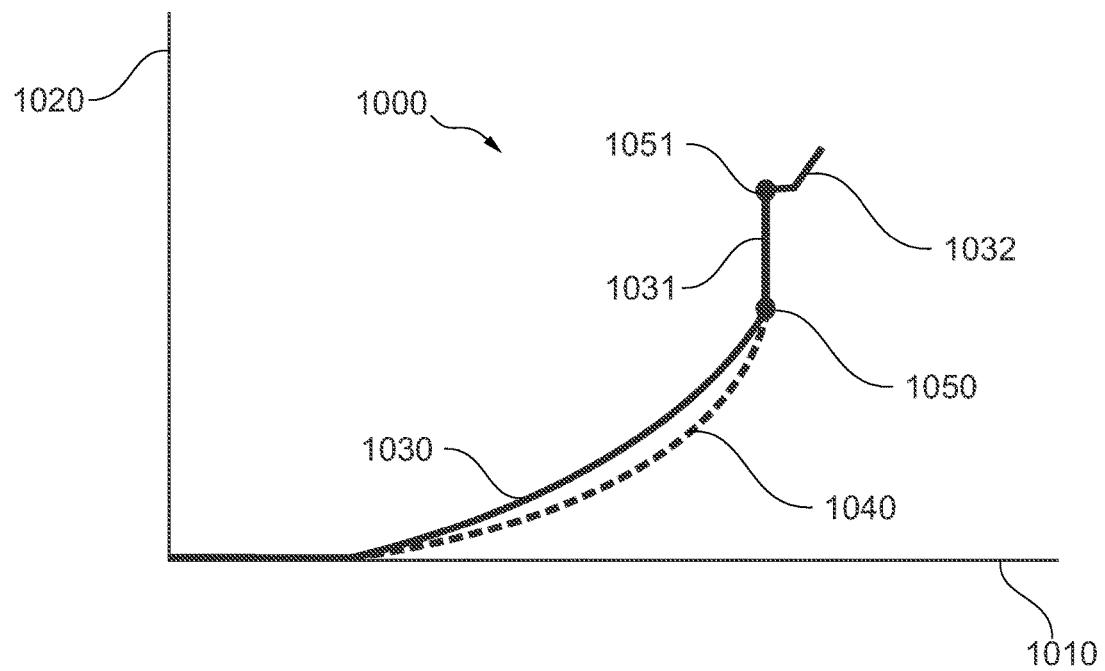
FIG. 10 illustrates an exemplary output power curve for a wind turbine system operated according to embodiments described herein.

FIG. 10 illustrates an exemplary output power curve 1000 for a wind turbine system being operated according to embodiments described herein. The output power curve 1000 includes solid lines 1030, 1031 and 1032. Vertical axis 1020 may represent the output power of the wind turbine. Horizontal axis 1010 may exemplarily represent the rotational speed of a generator rotor, such as e.g. generator rotor 122 shown in FIGS. 2 and 5c. Accordingly, the output power curve 1000 may represent the output power of the wind turbine system as a function of the rotational speed of the generator rotor. Horizontal axis 1010 may alternatively represent the rotational speed of a rotatable shaft coupled to the generator, such as e.g. high-speed shaft 116 shown in FIGS. 2, 5a and 5b.

Solid line 1030, which extends until node 1050, and solid line 1031, which extends from node 1050 until node 1051, represent the output power while the wind turbine operates below its rated power. The rated power of the wind turbine system operating is indicated by node 1051. While operating below its rated power, the wind turbine system may be operated according to embodiments of a method described herein, wherein the method may include monitoring the power extraction parameter and controlling one or more operational variables of the wind turbine in response to monitoring the power extraction parameter. Solid line 1032, which extends from node 1051, represents the output power while the wind turbine operates at and above its rated power. While operating at or above rated power, the wind turbine system may be operated according to embodiments of a method described herein, wherein the method may include monitoring the output power and controlling one or more operational variables of the wind turbine in response to monitoring the output power.

Solid line 1030 may represent the output power while the wind turbine system operates below a rated wind speed. As shown, along solid line 1030, the output power increases as the rotational speed of the generator rotor increases. Dotted line 1040 represents a corresponding output power curve of a wind turbine system which is operated according to methods known in the art. As shown, solid line 1030 lies above dotted line 1040, indicating that the method described herein provides an improved performance of the wind turbine system in extracting power from the wind.

Node 1050 may represent the output power when the wind turbine operates at its rated wind speed. Solid line 1031 represents the output power of the wind turbine system being operated at and above its rated wind speed and yet below its rated power. At or above the rated wind speed, the rotational speed of the generator rotor may remain constant. As the wind speed increases above the rated wind speed, the output power may further increase while the rotational speed of the generator rotor remains constant, until the rated power is reached. This is indicated by solid line 1031 being perpendicular to horizontal axis 1010 and extending from node 1050 to node 1051.

Solid line 1032 represents the output power when the wind turbine system operates above its rated power. Since sudden increases of the wind speed may occur, e.g. due to a sudden gust of wind, the output power may temporarily increase when the wind turbine system operates above its rated power. This is indicated by solid line 1032 which has an upward slope even though the wind turbine system operates above its rated power.

According to embodiments, which can be combined with other embodiments described herein, the monitored power extraction parameter may be used to calculate the wind speed. According to embodiments, controlling one or more operational variables of the wind turbine system in response to monitoring the power extraction parameter may further include: controlling one or more operational variables of the wind turbine system by using the calculated wind speed. An advantage of using the monitored power extraction parameter to calculate the wind speed may be that the wind speed can be calculated accurately.

Figure 4:
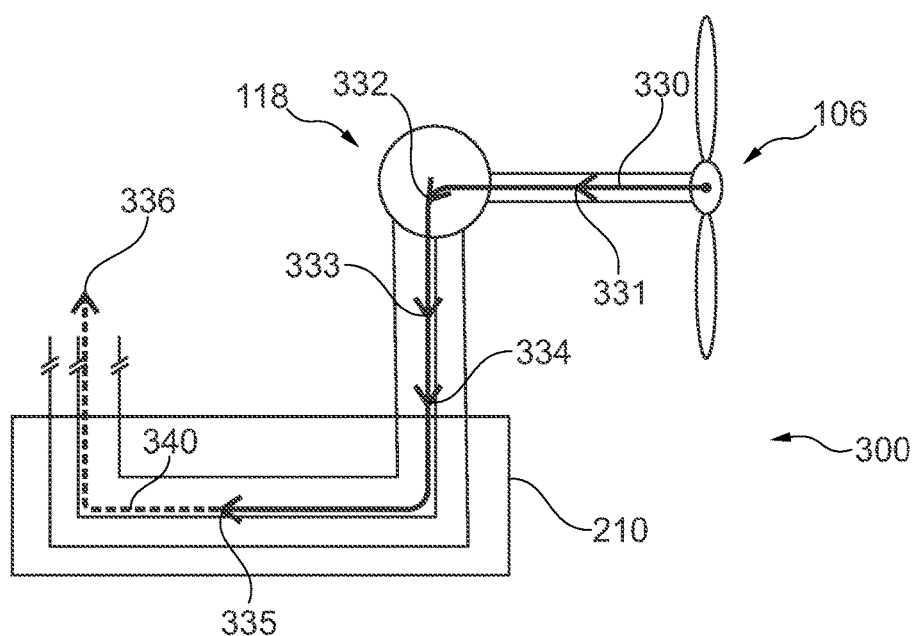
FIG. 4 illustrates a power flow through a wind turbine system, according to embodiments described herein.

FIG. 4 illustrates an exemplary flow of power through a wind turbine system. Power may be extracted from the wind at rotor 106. In particular, at the rotor, wind power may be transformed into a mechanical rotational power. The mechanical rotational power may drive generator 118. The generator may be adapted for converting the mechanical rotational power into electrical power. The electrical power generated by the generator may be transmitted to power conversion assembly 210. The power conversion assembly may be adapted for converting the electrical power generated by the generator into a converted electrical power. Accordingly, as shown by directed path 330, the power extracted by the wind turbine system from the wind may flow from the rotor to the power conversion assembly. More specifically, as illustrated by directed path 330, power may flow from the rotor to the power conversion assembly via the generator.

As indicated by arrow 331 of directed path 330, the power extracted by the wind turbine system from the wind may flow from the rotor to the generator. The power flowing from the rotor to the generator may be a mechanical rotational power, e.g. a mechanical rotational power delivered by one or more shafts (not shown) which rotationally couple the generator to the rotor. As indicated by arrow 332 of directed path 330, the power extracted from the wind by the wind turbine system may flow through the generator. As indicated by arrow 333 of directed path 330, the power extracted from the wind by the wind turbine system may flow from the generator to the power conversion assembly. The power flowing from the generator to the power conversion assembly may be an electrical power. As indicated by arrow 334 of directed path 330, power may flow into the power conversion assembly. As shown by arrow 335, electrical power may flow through the power conversion assembly.

In the power conversion assembly, electrical power generated by the generator may be converted into the converted electrical power. The conversion of power is illustrated by a transition of directed path 330 into the second directed path 340. Accordingly, the power flowing from the rotor to the power conversion assembly prior to being converted in the power conversion assembly is indicated by directed path 330. The flow of the converted electrical power is indicated by the second directed path 340.

According to embodiments, which can be combined with other embodiments described herein, the wind turbine system may include a rotor, such as e.g. rotor 106 shown in FIG. 2, for transforming wind power into a mechanical rotational power. The power extracted by the wind turbine system from the wind may include a power flowing from the rotor to the power conversion assembly, such as e.g. the power flowing according to directed path 330 shown in FIG. 4. Accordingly, the power extraction parameter may be a power flow parameter. The power flow parameter may be indicative of the power flowing from the rotor to the power conversion assembly prior to being converted in the power conversion assembly.

The wind turbine system may further include a generator, such as e.g. generator 118 shown in FIG. 2, for converting the mechanical rotational power into electrical power. According to embodiments, which can be combined with other embodiments, the power conversion assembly may be adapted to convert the electrical power generated by the generator. Accordingly, the power extracted by the wind turbine system from the wind may be a power flowing from the rotor to the power conversion assembly via the generator. The power flow parameter may be indicative of the power flowing from the rotor to the power conversion assembly prior to being converted in the power conversion assembly, such as e.g. the power flowing according to directed path 330 shown in FIG. 4.

According to embodiments, which can be combined with other embodiments described herein, the generator may be rotationally coupled to the rotor. Rotation of the rotor may drive the generator via the rotational coupling of the generator to the rotor. Accordingly, mechanical rotational power of the rotor may be provided to the generator via the rotational coupling of the generator with the rotor.

The generator may be rotationally coupled to the rotor via one or more rotatable shafts coupled to the rotor and/or the generator. The power flow parameter may be a torque applied to the one or more rotatable shafts.

According to embodiments, the rotor may be rotationally coupled to the generator via a low-speed shaft, a step-up gearbox and/or a high-speed shaft. The one or more rotatable shafts may include the high-speed shaft and/or the low-speed shaft. Accordingly, the power flow parameter may be the torque applied to the low-speed shaft or the torque applied to the high-speed shaft.

Figure 5A:
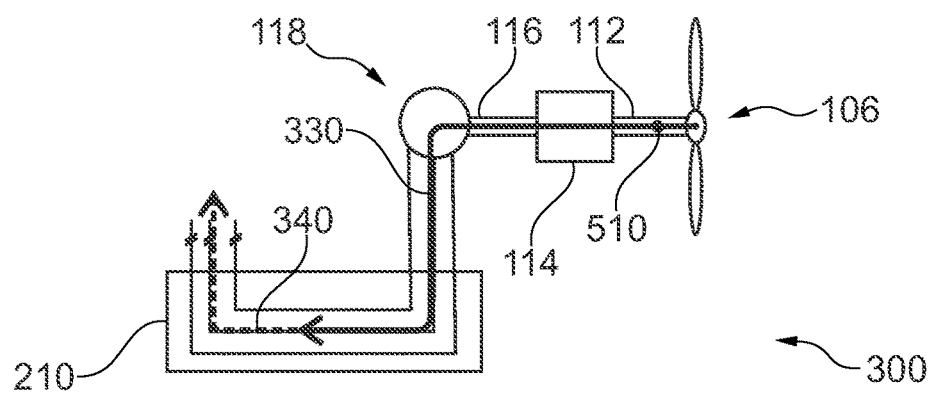
FIGS. 5a-5d illustrate embodiments of a power flow parameter, as described herein.
Figure 5B:
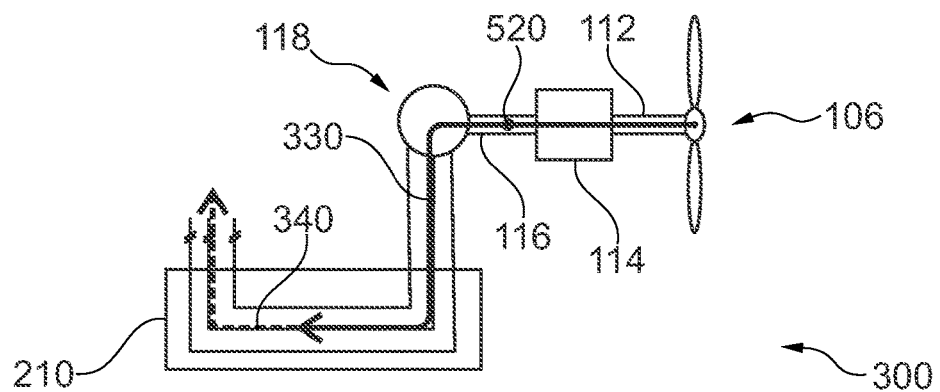

FIGS. 5a-5d illustrate exemplary embodiments of the power flow parameter. In FIGS. 5a and 5b, low-speed shaft 112, step-up gearbox 114 and high-speed shaft 116 are shown. One end of the low-speed shaft may be rotationally coupled to the rotor; the other end of the low-speed shaft may be coupled to the step-up gearbox. One end of the high-speed shaft may be rotationally coupled to the step-up gear-box, and the other end of the high-speed shaft may be rotationally coupled to the generator. Accordingly, as indicated by directed path 330, wind power may be extracted at the rotor and transformed by the rotor into a mechanical rotational power of the low-speed shaft; the rotational power of the low speed shaft may be stepped up by the step-up gearbox; the stepped-up rotational power may be transferred from the step-up gearbox to the high-speed shaft; the stepped-up rotational power of the high-speed shaft may be fed to the generator.

In FIG. 5a, the power flow parameter is the torque applied to low speed shaft 112. This is schematically illustrated by a reference node 510 disposed on the low-speed shaft. Reference node 510 is disposed on the portion of directed path 330 intersecting the low-speed shaft. The torque applied to low speed shaft 112 may be indicative of the power flowing from the rotor to the power conversion assembly. More specifically, the torque applied to low-speed shaft 112 may be indicative of the power flowing, from the rotor to the power conversion assembly, at reference node 510.

In FIG. 5b, the power flow parameter is the torque applied to the high-speed shaft. This is indicated by a reference node 520 disposed on high-speed shaft 116. Reference node 520 is disposed on the portion of directed path 330 intersecting the high-speed shaft. The torque applied to the high-speed shaft may be indicative of the power flowing from the rotor to the power conversion assembly. More specifically, the torque applied to the high-speed shaft may be indicative of the power flowing, from the rotor to the power conversion assembly, at reference node 520.

According to embodiments, which can be combined with other embodiments described herein, the generator may be rotationally coupled to the rotor via a single shaft, wherein one end of the single shaft may be rotationally coupled to the rotor and another end of the single shaft may be coupled to the generator. Accordingly, wind power may be extracted at the rotor and transformed by the rotor into a mechanical rotational power of the single shaft. The rotational power of the single shaft may be fed to the generator. The power flow parameter may be the torque applied to the one or more rotatable shafts.

Figure 5C:
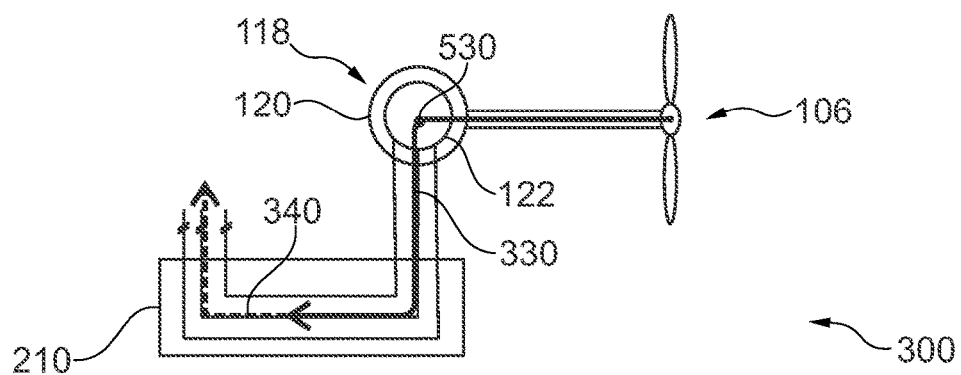

According to embodiments, which can be combined with other embodiments described herein, the power flow parameter may be the air gap torque applied to a generator rotor included in the generator. Such a situation is illustrated in FIG. 5c, which shows generator rotor 122 and generator stator 120 included in generator 118. Reference node 530 is disposed on the portion of directed path 330 passing through the generator rotor, to indicate that the power flow parameter is the air gap torque applied to the generator rotor. The air gap torque acting on the generator rotor may be indicative of the power flowing from the rotor to the power conversion assembly. Specifically, the air gap torque may be indicative of the power flowing along directed path 330 at reference node 530.

The air gap torque can be understood as the torque acting on the generator rotor. More specifically, the air gap torque may refer to the torque acting on the generator rotor through the air gap that exists between the rotor and the stator. The air gap torque may be proportional to the electrical power produced by the generator. It may be inversely proportional to the angular velocity of the generator rotor.

Figure 5D:
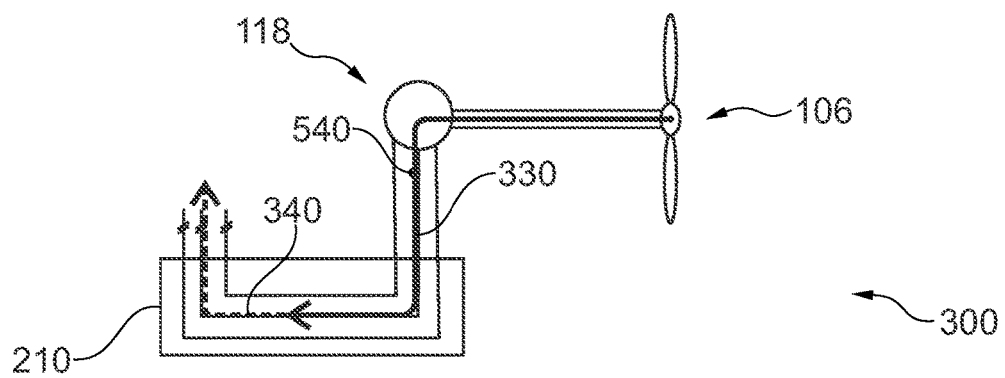

According to embodiments, which can be combined with other embodiments described herein, the power flow parameter may be the electrical power generated by the generator. This is illustrated in FIG. 5d, where reference node 540 is disposed on the portion of directed path 330 between the generator and the power conversion assembly. The power generated by generator 118 may be indicative of the power flowing from the rotor to the power conversion assembly. Specifically, power generated by generator 118 may be indicative of the power flowing at reference node 540.

The wind turbine system may include a transformer, such as e.g. electric power main transformer 234 shown in FIG. 2. The transformer may be adapted for transmitting power generated by the wind turbine system to an electric grid. The transformer may have a primary transformer side and a secondary transformer side. According to embodiments, which can be combined with other embodiments described herein, monitoring the output power of the wind turbine system may include monitoring the output power at the primary transformer side and/or monitoring the output power at the secondary transformer side.

The transformer may include a primary winding and a secondary winding, wherein the primary and secondary winding may define the primary and secondary side of the transformer, respectively. According to typical embodiments, the primary winding is adapted for receiving the electrical power supplied to the transformer and the secondary winding is adapted for transmitting power from the transformer to the electric grid. In the embodiment shown in FIG. 2, the primary transformer side is the right hand side of the transformer, i.e. the side at which generator-side bus 236 is disposed, and the secondary transformer side is the left-hand side of the transformer, i.e. the side at which breaker-side bus 240 is disposed.

According to embodiments, which can be combined with other embodiments described herein, controlling one or more operational variables of the wind turbine system in response to monitoring the output power may include one or more of the following options: the output power of the wind turbine system; the rotational speed of the rotor; a torque applied to a rotatable shaft coupled to the rotor and/or the generator; the pitch of at least one blade of the rotor.

The one or more operational variables of the wind turbine system which may be controlled in response to monitoring the output power, and the one or more operational variables which may be controlled in response to monitoring the power extraction parameter, may refer to the same operational variables being controlled, to partially the same operational variables or to different operational variables.

Figure 6:
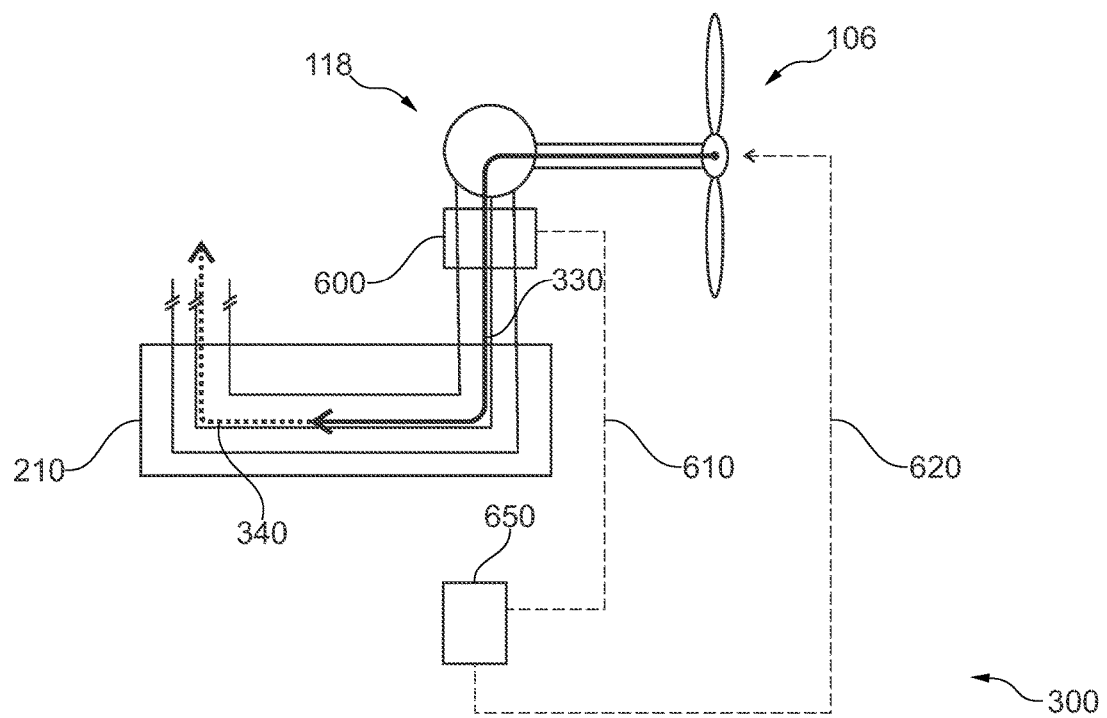
FIG. 6 is a schematic view of an exemplary wind turbine system including a monitoring unit, according to embodiments described herein.

FIG. 6 shows an embodiment of a wind turbine system including a monitoring unit 600. Monitoring unit 600 may be adapted to monitor the power flow parameter, wherein the power flow parameter may be indicative of the power flowing from the rotor to the power conversion assembly prior to being converted in the power conversion assembly. A monitoring unit may be provided in all other embodiments described herein. In the exemplary embodiment shown in FIG. 6, the power flow parameter may be the electrical power generated by the generator; this is indicated by the monitoring unit being disposed on the portion of directed path 330 between the generator and the power conversion assembly. The power flow parameter may however be a power flow parameter as e.g. described with respect to FIGS. 5a-5d, or generally any power flow parameter which is indicative of the power flowing from the rotor to the generator before being converted in the power conversion assembly.

The monitoring unit may be disposed in the wind turbine system such as to facilitate monitoring the power flow parameter. The monitoring unit may be disposed outside of the power conversion assembly. Under some conditions, the monitoring unit may be included in the power conversion assembly or be a part of the power conversion assembly; for example, the monitoring unit may be a part of the power conversion assembly, wherein the power flow parameter may be calculated by the power conversion assembly.

The monitoring unit shown in FIG. 6 may be adapted to provide data about the monitored power flow parameter to control unit 650. This is indicated by dotted line 610 extending from the monitoring unit to the control unit.

The control unit 650 may be configured to receive the data about the power flow parameter as input data. Control unit 650 may further be configured to control one or more operational variables of the wind turbine system, as indicated by arrow 620. Control unit 650 may be configured to control the one or more operational variables in response to receiving the input data about the power flow parameter. In the exemplary embodiment shown, arrow 620 points from the control unit to the rotor, indicating that the one or more operational variables controlled by the control unit may include e.g. the rotational speed of the rotor. Other operational variables may however be controlled by control unit 650.

Embodiments described herein relate to a wind turbine system. The wind turbine system may include a rotor, a generator and a power conversion assembly according to embodiments described herein. The wind turbine system may further include a monitoring unit and a control unit.

The monitoring unit may be adapted to monitor the power flow parameter. To facilitate monitoring of the power flow parameter, the monitoring unit may include one or more sensors, such as voltage or electric current sensors and/or other sensors. The one or more sensors may be adapted for measuring the power flow parameter and/or measuring one or more further parameters which may facilitate monitoring the power flow parameter. The monitoring unit may also include a processor for processing information and/or performing calculations. The processor may be adapted for calculating and/or estimating the power flow parameter. For example, the processor may be adapted for calculating the power flow parameter based on measured data, wherein the measured data may be measured by sensors included in the monitoring unit and/or by other sensors.

The monitoring unit may further be adapted to provide data about the monitored power flow parameter to the control unit. The data about the monitored power flow parameter may include: a numerical value approximating the actual value of the power flow parameter at a given moment in time; a set of numerical values approximating the actual values of the power flow parameter over a period of time; a set of numerical values approximating the actual values of the power flow parameter over a period of time at regular or irregular intervals; or a combination thereof.

The control unit may be configured to control one or more operational variables of the wind turbine system in response to receiving the data about the monitored power flow parameter. The one or more operational variables controlled by the control unit may be similar to, the same as, or partially the same as the one or more operational variables controlled in response to monitoring the power flow parameter, according to embodiments of the method described herein.

According to embodiments, which can be combined with embodiments described herein, the wind turbine system may be adapted for carrying out a method for controlling the wind turbine system according to embodiments described herein. According to embodiments, the monitoring unit may be adapted to monitor the power flow parameter and/or the control unit may be adapted to control one or more operational variables in response to the monitoring of the power flow parameter by the monitoring unit.

Figure 7:
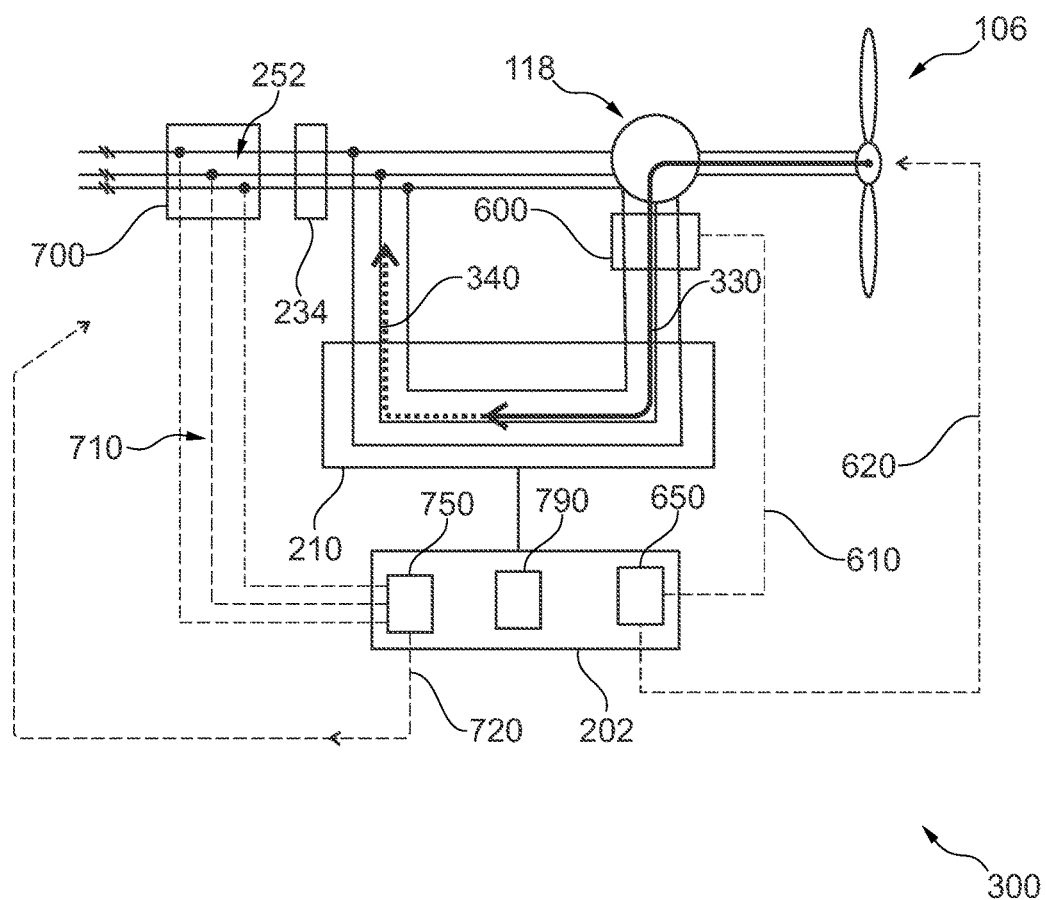
FIG. 7 is a schematic view of an exemplary wind turbine system including a first monitoring unit and a second monitoring unit, according to embodiments described herein.

FIG. 7 shows an exemplary embodiment of a wind turbine system wherein monitoring unit 600 may be a first monitoring unit 600 included in the wind turbine system, and the wind turbine system may include a second monitoring unit 700. Monitoring device 700 may include voltage and electric current sensors 252. As shown in FIG. 7, control unit 650 may be included in turbine controller 202. Control unit 650 may be a first control unit 650 included in the turbine controller. The turbine controller may include a second control unit 750 and a control selection unit 790.

The second monitoring unit shown in FIG. 7 may be configured to monitor the output power of the wind turbine system. The second monitoring unit may be configured to provide data about the monitored output power to the second control unit, as indicated by dotted line 710 extending from voltage and electric current sensors 252 to the second control unit. Voltage and electric current sensors 252 may e.g. be adapted for measuring the output power of the wind turbine system.

Second control unit 750 may be configured to control one or more operational variables of the wind turbine system, as indicated by arrow 720. Second control unit 750 may be configured to control the one or more operational variables in response to receiving the data about the output power of the wind turbine system. In the exemplary embodiment shown, arrow 720 points from the second control unit towards the transformer 234, indicating that the one or more operational variables controlled by the second control unit 750 may include e.g. the output power of the wind turbine system. Other and/or additional operational variables may however be controlled by second control unit 750.

The wind turbine system shown in FIG. 7 may have a rated power. Control selection unit 790 may be configured to put first control unit 650 into operation while the wind turbine system operates below its rated power and/or to put second control unit 750 into operation while the wind turbine system operates at or above its rated power.

Putting the first and second control unit into operation may include switching on the first and second control unit, respectively. For example, control selection unit 790 may include a first switch (not shown) for switching the first control unit on and off, and a second switch (not shown) for switching the second control unit on and off. The first switch may be different from the second switch. Alternatively, the first switch may be equal to the second switch, i.e. a single switch adapted for switching both the first and second control unit on and off. The first control unit may be switched on while the wind turbine system operates below its rated power and the second control unit may be switched on while the wind turbine system operates at or above its rated power.

For the sake of clarity, but without limitation of scope, the first and second control units are exemplarily drawn as physically separate control units in FIG. 7. The first and second control units however need not be separate control units. The first and the second control unit may be a first and a second sub-entity, respectively, of one common control unit of the wind turbine system, wherein the first and second sub-entity may not be physically separated within the common control unit. The first and the second control unit may represent a first and a second set of control tasks, respectively, which the common control system may be configured to carry out. The first and second set of control tasks may be different sets of control tasks. The first set of control tasks may include controlling one or more operational variables of the wind turbine system in response to receiving data about the monitored power flow parameter, wherein the data about the monitored power flow parameter may be provided to the common control unit by the first monitoring unit. The second set of control tasks may include controlling one or more operational variables of the wind turbine system in response to receiving data about the monitored output power, wherein the data about the monitored output power may be provided to the common control unit by the second monitoring unit.

According to embodiments, which can be combined with other embodiments described herein, the wind turbine system may have a rated power, the monitoring unit may be a first monitoring unit and the control unit may be a first control unit. The wind turbine system may furthermore include a second monitoring unit, a second control unit and a control selection unit.

The second monitoring unit may be configured to monitor the output power of the wind turbine system and provide data about the monitored output power to the second control unit. The data about the monitored output power may include: a numerical value approximating the actual value of the output power at a given moment in time; a set of numerical values approximating the actual values of the output power over a period of time; a set of numerical values approximating the actual values of the output power over a period of time at regular or irregular intervals; or a combination thereof. The data about the monitored output power may be provided from a process of monitoring the output power according to embodiments of the method described herein.

The second control unit may be configured to control one or more operational variables of the wind turbine system in response to receiving the data about the monitored output power.

The one or more operational variables controlled by the second control unit may be similar to, the same as, or partially the same as embodiments of the one or more operational variables controlled in response to monitoring the output power, according to embodiments of the method described herein.

The one or more operational variables controlled by the second control unit may be different from, the same as, or partially the same as, the operational variables controlled by first control unit.

The control selection unit may be configured to put the first control unit into operation while the wind turbine system operates below its rated power and to put the second control unit into operation while the wind turbine system operates at or above its rated power. Accordingly, while operating below its rated power, the wind turbine system may be configured to control one or more operational variables of the wind turbine system in response to monitoring the power extraction parameter, according to embodiments of the method described herein; and, while operating at or above its rated power, the wind turbine system may be configured to controlling one or more operational variables of the wind turbine system in response to monitoring the output power, according to embodiments of the method described herein.

Figure 8:
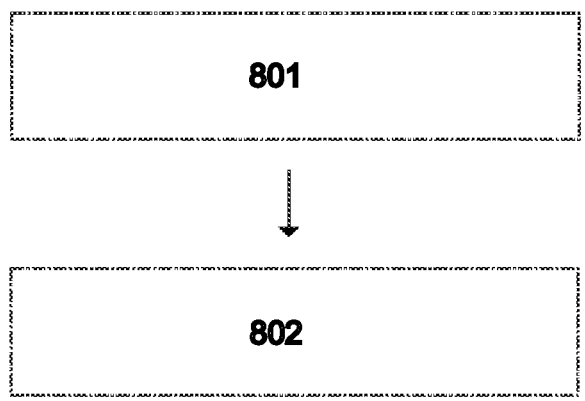
FIGS. 8 and 9 are flow diagrams representing methods for controlling a wind turbine system according to embodiments described herein.
Figure 9:
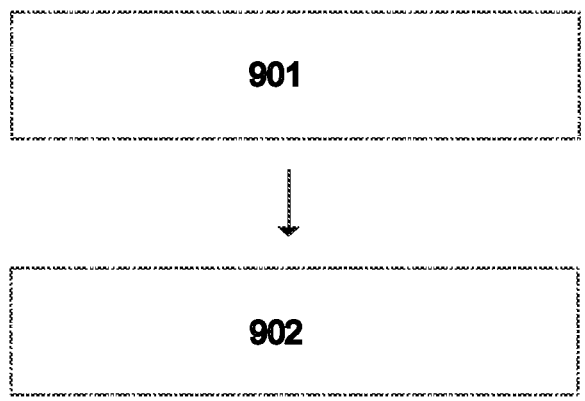

FIGS. 8 and 9 are schematic flow diagrams which illustrate methods for controlling a wind turbine according to embodiments described herein.

The schematic flow diagram shown in FIG. 8 illustrates a method for controlling a wind turbine system, wherein the wind turbine system may include a power conversion assembly for converting electrical power into a converted electrical power. As indicated by reference sign 801, the method may include monitoring a power extraction parameter, wherein the power extraction parameter is indicative of the power extracted by the wind turbine system from the wind prior to being converted in the power conversion assembly. As further indicated by reference sign 802, the method may further include controlling one or more operational variables of the wind turbine system in response to monitoring the power extraction parameter.

The schematic flow diagram shown in FIG. 9 illustrates a further method for controlling a wind turbine system. The wind turbine system may include a rotor for transforming wind power into a mechanical rotational power; a generator for converting the mechanical rotational power into electrical power; and a power conversion assembly for converting the electrical power generated by the generator into a converted electrical power. As indicated by reference sign 901, the method may include monitoring a power flow parameter, the power flow parameter being indicative of the power flowing from the rotor to the power conversion assembly prior to being converted in the power conversion assembly. As further indicated by reference sign 902, the method may further include controlling one or more operational variables of the wind turbine system in response to monitoring the power flow parameter.

Exemplary embodiments of wind turbine systems and methods for controlling wind turbine systems are described above in detail. The systems and methods are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a wind turbine system, the wind turbine system including a power conversion assembly for converting electrical power into a converted electrical power, the method comprising:
   determining whether the wind turbine system is operating below, at, or above a rated power; and
   tailoring control of the wind turbine system based on whether the wind turbine system is operating below, at, or above the rated power, wherein,
   when the wind turbine system operates below the rated power, the method further comprises:
      monitoring a power extraction parameter, wherein the power extraction parameter is indicative of a wind power extracted by the wind turbine system from wind prior to being converted in the power conversion assembly; and
      controlling one or more operational variables of the wind turbine system based on the power extraction parameter;
   when the wind turbine system operates at or above the rated power, the method further comprises:
      monitoring an output power of the wind turbine system supplied to an electric grid; and
      controlling the one or more operational variables of the wind turbine system based on the output power.

2. The method according to claim 1, further comprising:
   using the monitored power extraction parameter to calculate a wind speed;
   wherein controlling the one or more operational variables of the wind turbine system based on the power extraction parameter includes controlling the one or more operational variables by using the calculated wind speed.

3. The method according to claim 1, wherein the wind turbine system includes a rotor adapted for transforming the wind power extracted by the wind turbine system into a mechanical rotational power.

4. The method according to claim 3, wherein the power conversion assembly is adapted to convert electrical power generated by a generator included in the wind turbine system, wherein the generator is adapted for converting the mechanical rotational power into the electrical power.

5. The method according to claim 4, wherein the power extraction parameter comprises at least one of:
   an air gap torque applied to a generator rotor included in the generator;
   the electrical power generated by the generator;
   a torque applied to a rotatable shaft included in the wind turbine system, the rotatable shaft being rotationally coupled to the generator rotor; and,
   a rotational speed of the rotatable shaft.

6. The method according to claim 5, wherein controlling the one or more operational variables includes at least one of:
   controlling a rotational speed of the rotor;
   controlling a pitch of at least one blade included in the rotor; and,
   controlling a magnetic load of the generator.

7. The method according to claim 1, wherein monitoring the output power of the wind turbine system comprises:

monitoring the output power of the wind turbine system at a primary and/or secondary side of a transformer included in the wind turbine system, wherein the transformer is adapted for transmitting the converted electrical power to an electric grid.

8. A method for controlling a wind turbine system, the wind turbine system including:
   a rotor for transforming wind power into a mechanical rotational power;
   a generator for converting the mechanical rotational power into electrical power; and
   a power conversion assembly for converting the electrical power generated by the generator into a converted electrical power;
   the method comprising:
      determining whether the wind turbine system is operating below, at, or above a rated power; and
      tailoring control of the wind turbine system based on whether the wind turbine system is operating below, at, or above the rated power, wherein,
      when the wind turbine system operates below the rated power, the method further comprises:
         monitoring a power flow parameter, the power flow parameter being indicative of the mechanical rotational power from the rotor prior to being converted to the converted electrical power via the generator and the power conversion assembly; and
         controlling one or more operational variables of the wind turbine system based on the power flow parameter;
      when the wind turbine system operates at or above the rated power, the method further comprises:
         monitoring the converted electrical power of the wind turbine system; and,
         controlling the one or more operational variables of the wind turbine system based on the converted electrical power.

9. The method according to claim 8, wherein the power flow parameter is at least one of:
   an air gap torque applied to a generator rotor included in the generator;
   the electrical power generated by the generator;
   a torque applied to a rotatable shaft included in the wind turbine system, the generator rotor being rotationally coupled to the generator via the rotatable shaft; and,
   a rotational speed of the rotatable shaft.

10. The method according to claim 8, wherein monitoring the converted electrical power of the wind turbine system comprises:
   monitoring the converted electrical power of the wind turbine system at a primary and/or secondary side of a transformer included in the wind turbine system, wherein the transformer is adapted for transmitting the converted electrical power to an electric grid.

11. The method according to claim 8, wherein controlling the one or more operational variables includes at least one of:
   controlling a rotational speed of the rotor;
   controlling a pitch of at least one blade included in the rotor; and,
   controlling a magnetic load of the generator.

12. The method according to claim 8, further comprising:
   using the monitored power flow parameter to calculate a wind speed;
   wherein controlling the one or more operational variables of the wind turbine system based on the power flow parameter includes controlling the one or more operational variables by using the calculated wind speed.

13. A wind turbine system comprising:
   a rotor for transforming wind power into a mechanical rotational power;
   a generator for converting the mechanical rotational power into electrical power;
   a power conversion assembly for converting the electrical power generated by the generator into a converted electrical power;
   a monitoring unit adapted to:
      determine whether the wind turbine system is operating below, at, or above a rated power; and
      tailor control of the wind turbine system based on whether the wind turbine system is operating below, at, or above the rated power, wherein,
   when the wind turbine system operates below the rated power, the monitoring unit is configured to:
      monitor a power flow parameter, the power flow parameter being indicative of the mechanical rotational power from the rotor prior to being converted via the generator and the power conversion assembly; and,
   when the wind turbine system operates at or above the rated power, the monitoring unit is configured to:
      monitor an output power of the wind turbine system supplied to an electric grid; and,
   a control unit,
      wherein, when the wind turbine system operates below the rated power, the control unit is configured to:
         control one or more operational variables of the wind turbine system based on the monitored power flow parameter, the monitored power flow parameter being provided to the control unit by the monitoring unit; and
      wherein, when the wind turbine system operates at or above the rated power, the control unit is configured to:
         control the one or more operational variables of the wind turbine system based on the output power.

14. The wind turbine system according to claim 13, wherein:
   the control unit is adapted to control the one or more operational variables of the wind turbine system based on the monitored power flow parameter and the output power while the wind turbine system operates below the rated power.

15. The wind turbine system according to claim 13, wherein the monitoring unit is a first monitoring unit and the control unit is a first control unit, wherein the wind turbine system further comprises:
   a second monitoring unit configured to monitor the output power of the wind turbine system;
   a second control unit configured to control the one or more operational variables of the wind turbine system based on the monitored output power, the monitored output power being provided to the second control unit by the second monitoring unit; and,
   a control selection unit configured to put the first control unit into operation while the wind turbine system operates below the rated power and to put the second control unit into operation while the wind turbine system operates at or above the rated power.

16. The wind turbine system according to claim 13, wherein the power flow parameter is at least one of:
   an air gap torque applied to a generator rotor included in the generator;

the electrical power generated by the generator;
a torque applied to a rotatable shaft included in the wind turbine system, the rotor being rotationally coupled to the generator via the rotatable shaft; and,
a rotational speed of a rotatable shaft included in the wind turbine system, the rotor being rotationally coupled to the generator via the rotatable shaft.

17. The wind turbine system according to claim 15, further comprising:
a transformer for transmitting the converted electrical power to an electric grid, the transformer having a primary and a secondary transformer side;
the second monitoring unit being adapted to monitor the output power of the wind turbine system at the primary and/or secondary transformer side.

18. The wind turbine system according to claim 13, wherein the one or more operational variables controlled by the control unit comprise at least one of:
a rotational speed of the rotor;
a pitch of at least one blade included in the rotor; and
a magnetic load of the generator.

* * * * *